United States Patent
Kearsey et al.

(10) Patent No.: US 9,499,272 B2
(45) Date of Patent: Nov. 22, 2016

(54) OVERHEAD STORAGE BIN LATCH SYSTEM

(71) Applicant: C&D ZODIAC, INC., Huntington Beach, CA (US)

(72) Inventors: Stephen Kearsey, Huntington Beach, CA (US); Eric Long, Huntington Beach, CA (US); Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 14/923,905

(22) Filed: Oct. 27, 2015

(65) Prior Publication Data

US 2016/0114889 A1 Apr. 28, 2016

Related U.S. Application Data

(63) Continuation-in-part of application No. 14/796,829, filed on Jul. 10, 2015.

(60) Provisional application No. 62/069,163, filed on Oct. 27, 2014.

(51) Int. Cl.
*E05C 9/10* (2006.01)
*E05C 9/00* (2006.01)
(Continued)

(52) U.S. Cl.
CPC ........... *B64D 11/003* (2013.01); *A47B 46/005* (2013.01); *B60Q 3/025* (2013.01);
(Continued)

(58) Field of Classification Search
CPC .... E05B 53/00; E05B 53/003; E05B 53/005; Y10S 292/37
USPC ......... 292/44, 45, 50, 194, 219, 220, 225, 9, 292/12, 15, 23, 95, 96, 121, 122, 126, 128
See application file for complete search history.

(56) References Cited

U.S. PATENT DOCUMENTS 186,746 A * 1/1877 Mix .................... E05B 65/0864
292/128
192,355 A * 6/1877 Vogler ................ E05B 65/0811
24/2
(Continued)

FOREIGN PATENT DOCUMENTS

AT    WO 2010004039 A3 *  4/2010  ........... B64D 11/003
CA         2796834         10/2011
(Continued)

OTHER PUBLICATIONS

International Search Report and Written Opinion issued in PCT/US15/57513 on Jan. 19, 2016.
(Continued)

*Primary Examiner* — Carlos Lugo
(74) *Attorney, Agent, or Firm* — Jeffer Mangels Butler & Mitchell LLP; Brennan C. Swain, Esq.

(57) ABSTRACT

A latch system that includes a paddle button assembly having a button that is movable between a home position and an actuation position, a first latch assembly that includes a first striker assembly and a first hook assembly, and a first cable that extends between the paddle button assembly and the first latch assembly. Movement of the button from the home position to the actuation position moves the first cable, thereby disengaging the first hook assembly and the first striker assembly.

22 Claims, 7 Drawing Sheets

(51) Int. Cl.
- *B64D 11/00* (2006.01)
- *A47B 46/00* (2006.01)
- *E05C 19/00* (2006.01)
- *E05C 1/12* (2006.01)
- *E05B 53/00* (2006.01)
- *B60Q 3/02* (2006.01)

(52) U.S. Cl.
CPC .......... *B64D11/0015* (2013.01); *E05B 53/00* (2013.01); *E05B 53/003* (2013.01); *E05B 53/005* (2013.01); *E05C 1/12* (2013.01); *E05C 9/00* (2013.01); *E05C 19/00* (2013.01); *B64D 2011/0038* (2013.01); *Y02T 50/46* (2013.01); *Y10S 292/37* (2013.01)

(56) References Cited

U.S. PATENT DOCUMENTS

| | | | |
|---|---|---|---|
| 197,115 A * | 11/1877 | Frees | E05B 83/24 292/125 |
| 476,575 A * | 6/1892 | Sucro | E05B 65/5238 70/70 |
| 1,147,322 A * | 7/1915 | Hampton | E05B 85/24 292/220 |
| 1,754,889 A * | 4/1930 | Halinka | E05C 1/14 164/DIG. 8 |
| 2,833,578 A * | 5/1958 | Burke | E05C 19/024 292/216 |
| 2,881,021 A * | 4/1959 | Jacobson | E05B 65/0046 292/216 |
| 2,924,473 A * | 2/1960 | Krause | E05B 83/16 292/11 |
| 2,999,712 A * | 9/1961 | Jakeway | E05B 1/0038 292/336.3 |
| 3,080,743 A * | 3/1963 | Stansberry | E05B 5/00 292/173 |
| 3,113,798 A * | 12/1963 | Kramer | E05B 1/0038 292/336.3 |
| 3,506,292 A * | 4/1970 | Hagendoorn | E05C 19/024 292/216 |
| 4,456,289 A * | 6/1984 | Badiali | E05B 83/24 292/125 |
| 4,526,057 A * | 7/1985 | Mochida | E05B 53/005 292/336.3 |
| 4,544,189 A * | 10/1985 | Fiordellisi | E05B 79/20 292/336.3 |
| 4,633,724 A * | 1/1987 | Mochida | E05B 53/005 296/76 |
| 4,691,584 A * | 9/1987 | Takaishi | E05B 81/06 292/144 |
| 4,917,420 A * | 4/1990 | Rogers, Jr. | E05B 83/16 292/198 |
| 5,531,489 A * | 7/1996 | Cetnar | E05B 85/12 292/225 |
| 5,558,372 A * | 9/1996 | Kapes | E05B 83/36 292/336.3 |
| 5,662,369 A * | 9/1997 | Tsuge | B60N 2/366 292/225 |
| 5,853,060 A * | 12/1998 | Chao | E05B 83/16 180/289 |
| 5,927,794 A * | 7/1999 | Mobius | E05B 13/00 292/DIG. 14 |
| 6,026,705 A * | 2/2000 | Ficyk | F16C 1/101 292/195 |
| 6,050,619 A * | 4/2000 | Arabia, Jr. | F16C 1/12 292/216 |
| 6,092,845 A * | 7/2000 | Koenig | E05B 83/16 292/225 |
| 6,135,514 A * | 10/2000 | Kowalewski | E05B 83/16 292/216 |
| 6,309,008 B1 * | 10/2001 | Bacon | B62D 25/06 292/38 |
| 6,378,920 B1 * | 4/2002 | Ostrowski | E05B 83/16 292/216 |
| 6,427,500 B1 * | 8/2002 | Weinerman | B60J 7/198 292/196 |
| 6,485,071 B2 * | 11/2002 | Schwaiger | E05B 83/16 292/216 |
| 6,746,073 B2 * | 6/2004 | Heller | B60J 7/1851 292/33 |
| 6,896,302 B2 * | 5/2005 | Belchine, III | E05B 1/0038 292/110 |
| 6,908,137 B2 * | 6/2005 | Doxey | B60N 2/015 292/216 |
| 7,032,936 B2 * | 4/2006 | Promutico | D06F 37/42 292/341.17 |
| 7,040,675 B1 * | 5/2006 | Ott | B60J 7/19 292/123 |
| 7,261,328 B2 * | 8/2007 | Minix | E05B 13/10 292/28 |
| 7,552,954 B2 * | 6/2009 | Rozo | E05B 5/00 292/143 |
| 7,775,566 B2 * | 8/2010 | Hanjono | B60R 7/06 292/202 |
| 7,802,826 B2 * | 9/2010 | Schmitz | E05B 13/004 292/197 |
| 7,959,194 B2 * | 6/2011 | Mahoney | E05B 53/003 292/121 |
| 8,029,029 B2 * | 10/2011 | Terhaar | E05B 81/14 292/216 |
| 8,376,418 B2 * | 2/2013 | Osvatic | D06F 37/42 292/198 |
| 8,376,478 B2 * | 2/2013 | Weber | E05G 1/00 220/324 |
| 8,480,029 B2 | 7/2013 | Young | |
| 8,708,377 B2 | 4/2014 | Ishikawa et al. | |
| 8,770,515 B1 * | 7/2014 | Cloud | G05G 17/00 244/118.5 |
| 8,876,174 B2 * | 11/2014 | Motherwell | B62J 1/28 292/194 |
| 8,939,473 B2 * | 1/2015 | Costabel | E05B 41/00 292/117 |
| 9,188,143 B1 * | 11/2015 | Motherwell | E05C 3/30 |
| 2007/0013202 A1 * | 1/2007 | Tompson | B60R 7/04 296/37.1 |
| 2008/0142522 A1 * | 6/2008 | Maid | A47G 29/20 220/324 |
| 2014/0197721 A1 | 7/2014 | Savian | |
| 2015/0175321 A1 * | 6/2015 | Weber | B65D 43/164 292/220 |

FOREIGN PATENT DOCUMENTS

| | | | | |
|---|---|---|---|---|
| CN | EP 0606922 A1 * | 7/1994 | ......... | E05B 15/04 |
| DE | 29503953 U1 * | 5/1995 | ......... | E05B 53/005 |
| DE | 10047350 A1 * | 6/2001 | ......... | B60J 1/1884 |
| DE | 202014101793 U1 | 7/2014 | | |
| WO | WO 8502645 A1 * | 6/1985 | ......... | E05C 3/30 |

OTHER PUBLICATIONS

CA 2,859,823 Office Action dated Jul. 9, 2015.

* cited by examiner

OVERHEAD STORAGE BIN LATCH SYSTEM

CROSS REFERENCE TO RELATED APPLICATIONS

This application claims the benefit of U.S. Provisional Application No. 62/069,163, filed Oct. 27, 2014, and is a continuation-in-part of U.S. patent application Ser. No. 14/796,829, filed Jul. 10, 2015, both of which are herein incorporated by reference in their entireties.

FIELD OF THE INVENTION

The present invention relates generally to a latch system, and more particularly to a latch system for an aircraft overhead storage bin.

BACKGROUND OF THE INVENTION

Overhead storage bins in aircraft typically include latching systems to secure the pivotal bucket to the upper housing. However, many latch systems have proven unreliable. Accordingly, a need exists for an improved latch system. U.S. Patent Publication No. 2014/0197721 and U.S. patent application Ser. No. 14/796,829, filed Jul. 10, 2015 are incorporated by reference herein in their entireties.

SUMMARY OF THE PREFERRED EMBODIMENTS

In accordance with a first aspect of the present invention there is provided an aircraft storage bin that includes an upper housing that includes first and second side panels, a bucket that cooperates with the upper housing to define a bin interior, and a latch system. The bucket is movable with respect to the upper housing between an open position and a closed position and includes a bottom and first and second side walls. The latch system includes a paddle button assembly having a button that is movable between a home position and an actuation position, a first latch assembly that includes a first hook assembly and a first striker assembly, and a first cable that extends between the paddle button assembly and the first latch assembly. The paddle button assembly is associated with one of the bucket and the upper housing. The first hook assembly is associated with one of the bucket and the upper housing and the first striker assembly is associated with the other of the bucket and the upper housing. Movement of the button from the home position to the actuation position moves the first cable, thereby disengaging the first hook assembly and the first striker assembly, thereby causing the bucket to move from the closed position to the open position. In a preferred embodiment, the first hook assembly includes a first hook and the first striker assembly includes a first striker. Movement of the first cable moves one of the first hook and the first striker to disengage the first hook assembly and the first strike assembly. Preferably, the button is pivotal between the home position and the actuation position and the pivotal movement of the button pushes or pulls the first cable, thereby pivoting a first trigger arm from an engaged position to a disengaged position and disengaging the first hook from the first striker.

In a preferred embodiment, the first hook assembly includes a first rotary member that includes the first hook. The first rotary member is movable between a first position where the first hook is engaged with the first striker and a second position where the first hook is not engaged with the first striker. Preferably, the first rotary member is biased toward the second position. In a preferred embodiment, the first rotary member includes a first catch member that engages a first ledge on the first trigger arm in the first position and a first stop member in the second position. The first rotary member is preferably enclosed in a housing and includes a first closeout member. The housing includes a striker opening defined in a top wall thereof and the first closeout member is generally aligned with the striker opening when the rotary catch is in the second position.

In a preferred embodiment, the first paddle button assembly includes a first indicator that is movable from a first position to a second position when the button is moved from the home position to the actuation position. Preferably, the first paddle button assembly includes a first indicator that is movable from a first position to a second position when the button is moved from the home position to the actuation position and the first hook maintains the first trigger arm in the disengaged position when the first rotary member is in the second position, thereby maintaining the indicator in the second position.

In accordance with another embodiment of the present invention there is provided a latch system that includes a paddle button assembly having a button that is movable between a home position and an actuation position, a first latch assembly that includes a first striker assembly and a first hook assembly, and a first cable that extends between the paddle button assembly and the first latch assembly. Movement of the button from the home position to the actuation position moves the first cable, thereby disengaging the first hook assembly and the first striker assembly. Preferably, the button is pivotal between the home position and the actuation position and the pivoting of the button pivots a first cam member that pushes or pulls the first cable, thereby disengaging the first hook from the first striker.

In accordance with another aspect of the present invention there is provided a method of opening a storage bin that includes moving a button from a home position to an actuation position. Movement of the button from the home position to the actuation position moves a first cable, thereby disengaging a first hook assembly and a first striker assembly, wherein a bucket moves from a closed position to an open position. The method also includes maintaining an indicator in an indication position when a first latch assembly is engaged and a second latch assembly is disengaged.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
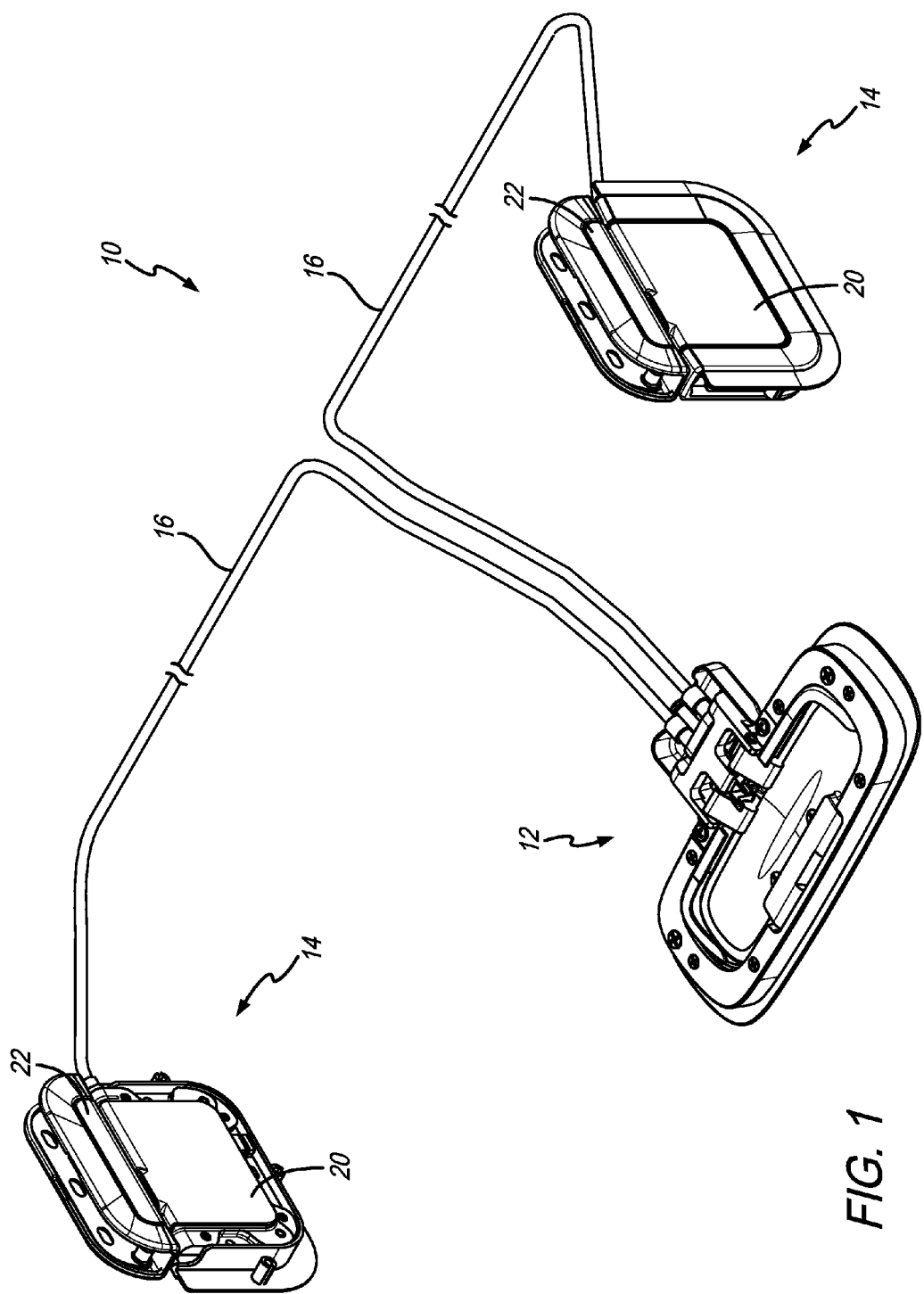
FIG. 1 is a perspective view of a latch system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
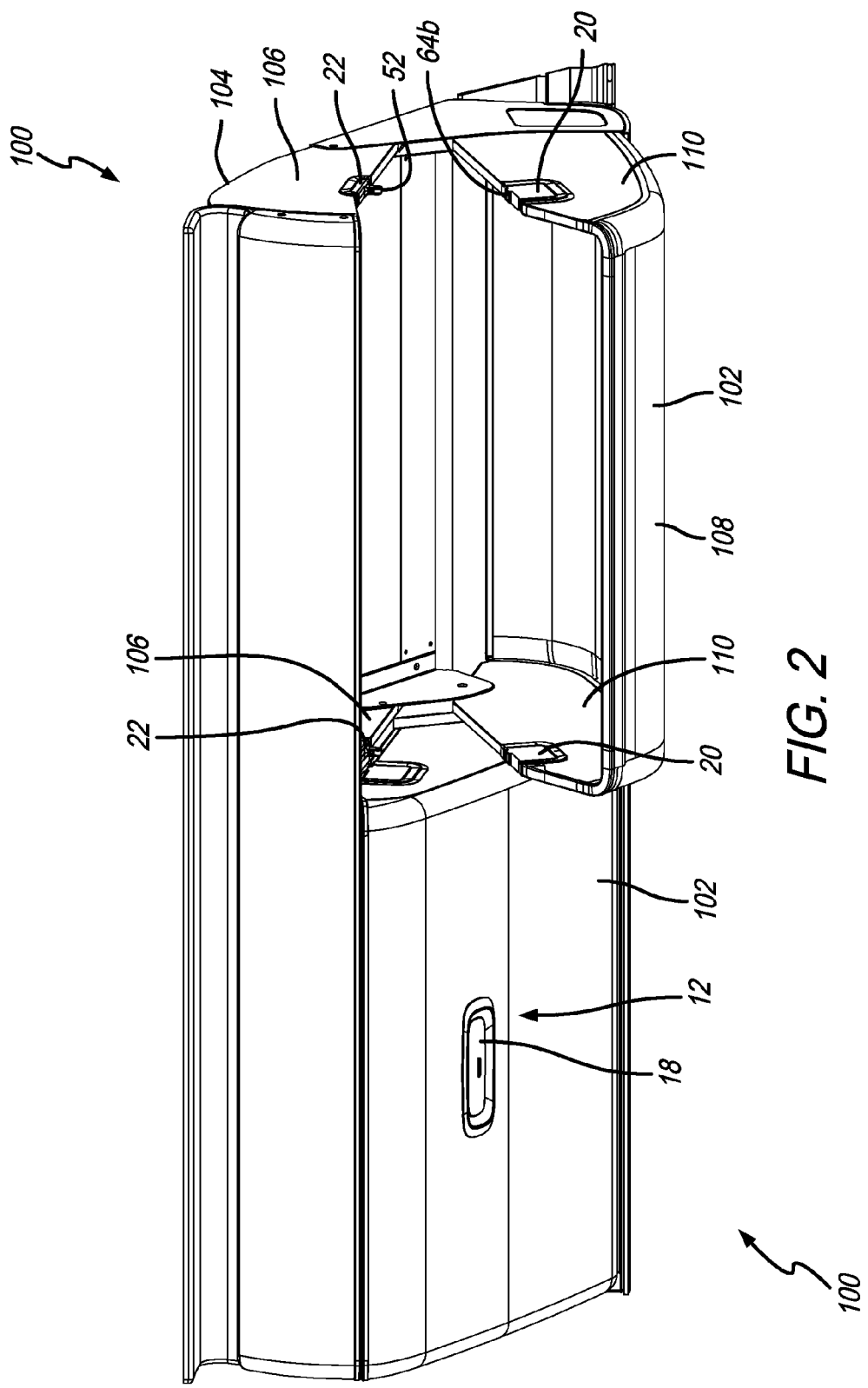
FIG. 2 is a perspective view of a dual pivot bin assembly with the latch system of FIG. 1 incorporated therein.

Referring now to the drawings, wherein the showings are for purposes of illustrating the present invention and not for purposes of limiting the same, FIGS. 1-9B show an embodiment of a latch system 10. However, this is not a limitation on the present invention and the latch system 10 can be used elsewhere. As shown in FIG. 1, generally, the latch system 10 includes a paddle button assembly 12, first and second latch assemblies 14 and first and second cables 16 extending between the paddle button assembly 12 and the first and second latch assemblies 14. As shown in FIG. 2, the latch system 10 can be used with a pivot bin assembly 100, such as those used in commercial passenger aircraft. However, this is not a limitation on the present invention and the latch system 10 can be used elsewhere. Preferably, the latch system 10 is used with an aircraft storage bin 100 that includes a bucket 102 that is pivotally connected to an upper housing 104. Preferably, the upper housing 104 includes first and second side panels 106. The bucket 102 cooperates with the upper housing to define a bin interior and is movable with respect to the upper housing 104 between an open position and a closed position. In a preferred embodiment, the bucket 102 includes a bottom 108 and first and second side walls 110. In another embodiment, the bucket can also include a top. For example, see the bucket taught in U.S. Patent Publication No. 2011/0253837, published on Oct. 20, 2011 (the "'837 publication"), the entirety of which is incorporated by reference herein.

As shown in FIG. 1, the latch system the paddle button assembly 12 includes a button 18 that is movable between a home position and an actuation position (see FIGS. 5A and 6B), the first and second latch assemblies 14 includes a first hook assembly 20 and a first striker assembly 22, and the first and second cables 16 extends between the paddle button assembly 12 and the first and second latch assemblies 14. The first and second latch assemblies 14 can be associated with the side panels and side walls of the upper housing 104 and bucket 102 or they can be associated with the front of the upper housing 104 and bucket 102. It will be appreciated that only a single latch assembly 14 can be utilized (on one side or in the middle of the bucket and upper housing).

As shown in FIG. 2, in a preferred embodiment, the paddle button assembly 12 is associated with or mounted on or in the bucket 102. However, in another embodiment, the paddle button assembly 12 can be associated with or mounted on or in the upper housing. In a preferred embodiment, the first and second hook assemblies 20 are associated with one of the bucket 102 and the upper housing 104 and the first and second striker assemblies 22 are associated with the other of the bucket 102 and the upper housing 104. The drawings show the hook assemblies 20 mounted in the side walls 110 of the bucket 102 and the striker assemblies 22 mounted in and extending downwardly from the side panels 106 of the upper housing 104. However, this arrangement can be reversed. In the embodiment shown in the drawings, the hook and striker assemblies 20 and 22 are generally aligned with the side walls and side panels, which allows the clamshell type bin to close. However, in another embodiment, the hook and striker assemblies 20 and 22 can be mounted on the inside of outside of the side walls or side panels. For example, if the latch system 10 was used with the pivot bin assembly taught in the '837 publication, the striker assemblies 22 could be mounted on the inner surfaces the side panels of the stationary upper housing and the hook assemblies 20 could be mounted on the outer surfaces of the side walls of the pivoting bin or vice versa.

Generally, movement of the button 18 from the home position (see FIG. 5A) to the actuation position (see FIG. 5B) moves the cables 16, thereby disengaging the hook assemblies 20 and the striker assemblies 22, thereby allowing the bucket to move from the closed position to the open position. This arrangement will be further described below.

Figure 3:
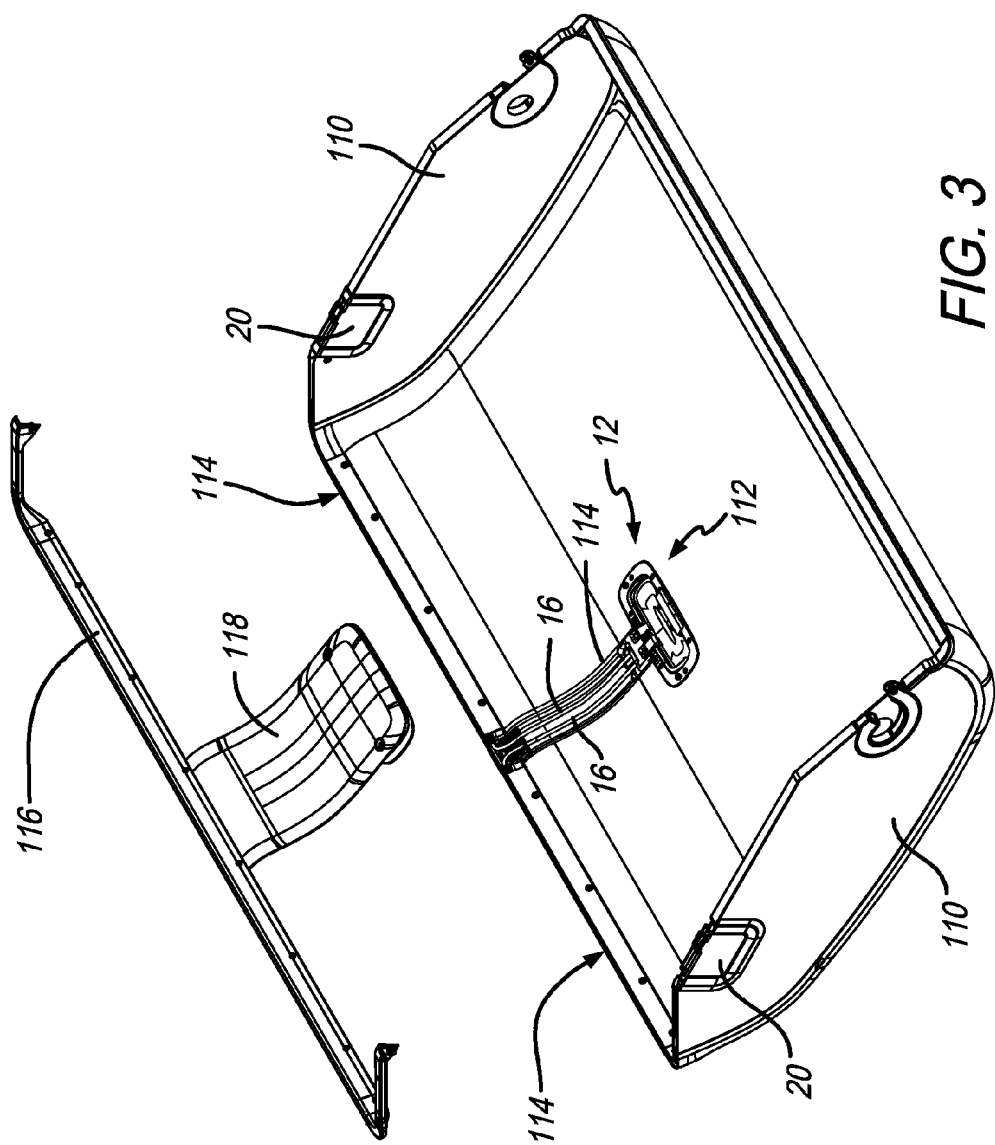
FIG. 3 is a perspective view of the bucket of the a dual pivot bin assembly with the latch system of FIG. 1 incorporated therein.

As shown in FIG. 3, in a preferred embodiment, paddle button assembly 12 is mounted in an opening 112 defined in the bottom 108 of the bucket 102. The cables 16 extend through a channel 114 defined in either the bucket 102, between the bucket 102 and trim 116 or in the trim. FIG. 3 shows the first portion of the channel 114 extending away from the paddle button assembly 12 defined in the bucket and covered by a cover 118 (which is exploded away) and the second portion of the channel 114 defined in the top of the front and side edges of the bucket 102 and to the striker assemblies 22. In another embodiment, the first portion of the channel 114 extends away from the paddle button assembly 12 and is defined in the bucket and covered by the cover 118 and the second portion of the channel 114 is defined between the top of the front and side edges of the bucket 102 and the inner surface of the trim 116. The cables 16 can be exposed or contained in an outer casing 17, similar to cables used for braking on bicycles. The bucket 102 can also includes the cover 118 that is mounted to an inside surface thereof for covering the paddle button assembly 12, cables 16 and associated components.

Figure 4:
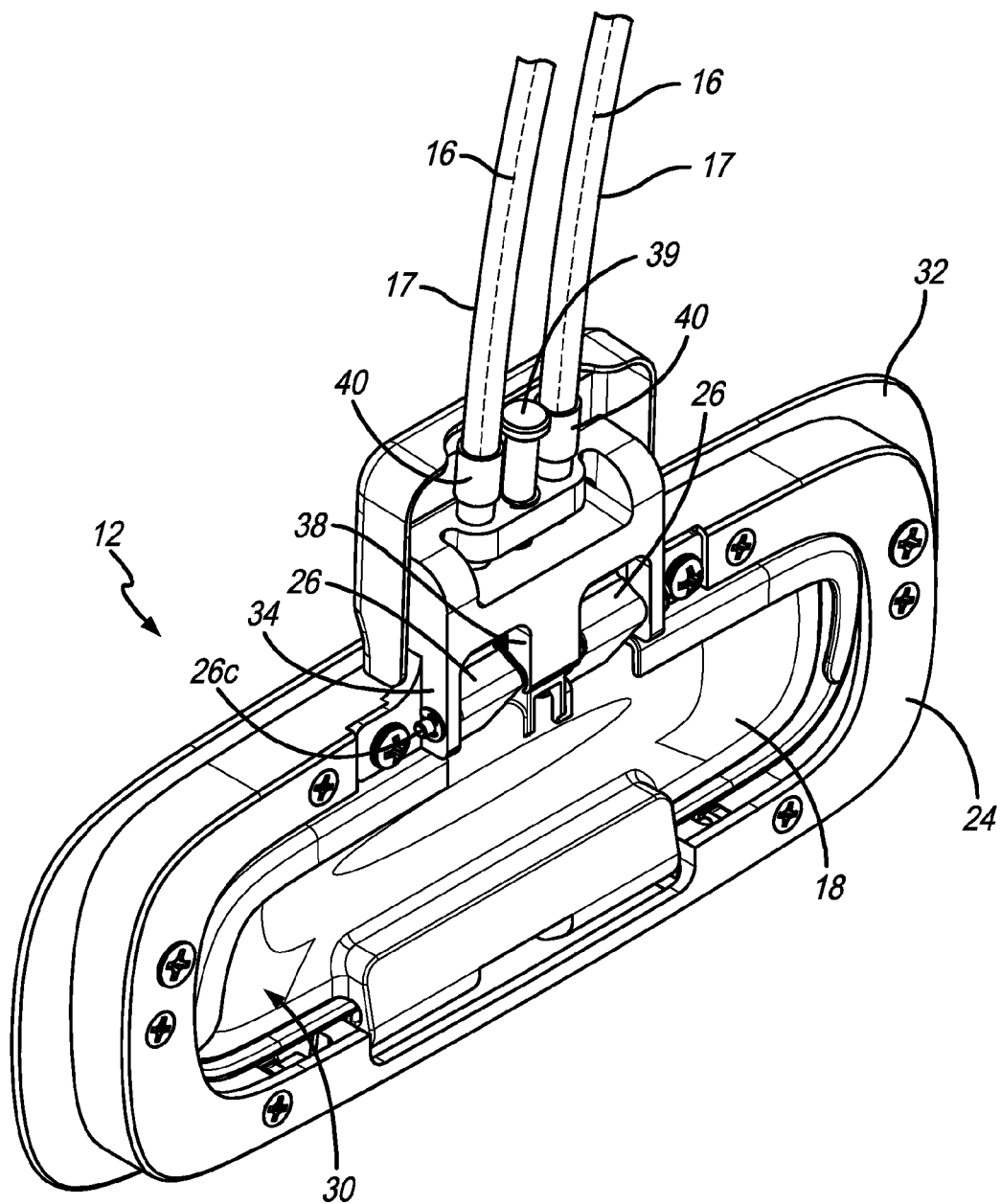
FIG. 4 is a perspective view of the paddle button assembly of the latch system of FIG. 1.
Figure 5A:
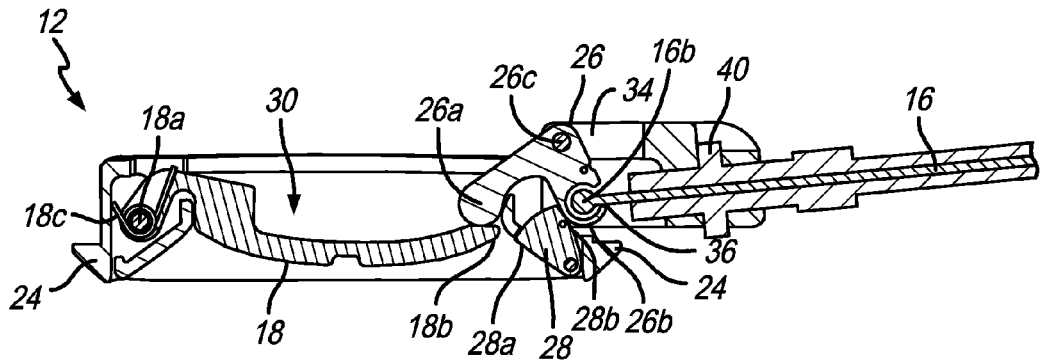
FIG. 5A is a cross-sectional view of the paddle button assembly with the button in the home position.
Figure 5B:
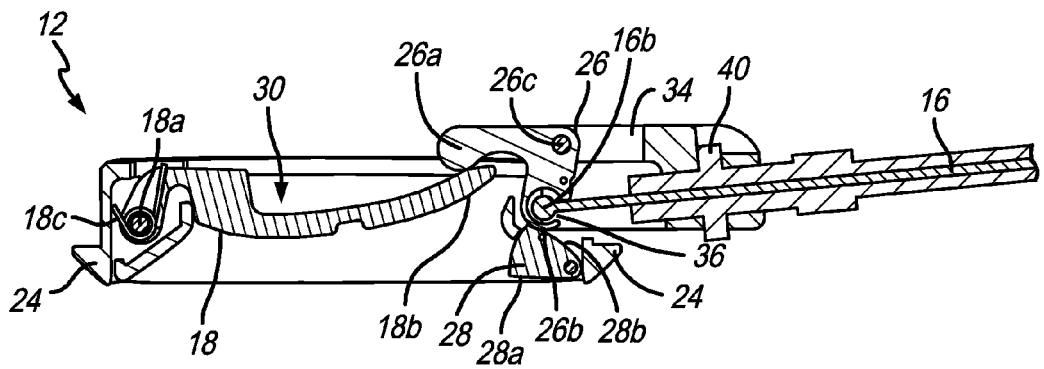
FIG. 5B is a cross-sectional view of the paddle button assembly with the button in the actuation position.

The paddle button assembly 12, which is best shown in FIGS. 4-5B, will now be described. Generally, the paddle button assembly 12 includes a frame 24, the button 18, first and second cam members 26, and an indicator 28 (described below). The frame 24 defines a central opening 30 that at least partially receives the button 18 and has an outer flange 32 that is mounted against the outside surface of the bucket 102. The button 18 is pivotally connected to the frame 24 (preferably by a pivot pin 18a that extends through associated openings in the frame 24 and button 18). The frame 24 also includes a hinge portion 34 that the cam members 26 are pivotally connected to. The hinge portion 34 can be integral with the frame 24 or a separate component.

As is best shown in FIGS. 5A-5B, in a preferred embodiment, the cam members 26 are generally "L" shaped and include a button engaging end 26a and a cable engaging end 26b. Preferably, the cable engaging end 26b includes an opening 36 that receives a ball 16b on the end of the cable 16. However any attachment of the cables 16 to the cable engaging ends 26b of the cam members 26 is within the scope of the present invention. The cam members 26 are preferably received in recesses 38 in the hinge portion 34 and are pivotal with respect to the hinge portion 34 (preferably by pivot pins 26c that extends through associated openings in the hinge portion 34 and button cam members 26).

As shown in FIG. 5A, the end 18b of the button 18 distal from the pivot point is engaged with the button engaging ends 26b of the cam members 26 (only one cam member is shown in FIG. 5A). FIG. 5A demonstrates the home position, which, as described below is associated with the engaged position of the first trigger arm and, ultimately, the closed position of the bin. To open the bin, a user pushes on button 18, which, pivots to the actuation position (shown in FIG. 5B). In a preferred embodiment, the button 18 is biased toward the home position. This can be done by a spring 18c. The distal end 18b of the button 18 pushes the button engaging ends 26a of the cam members 26, thereby pivoting the cam members 26 from a first position (shown in FIGS. 4 and 5A) to a second position (shown in FIG. 5B). The cam members 26 pulls the cables 16 (within casings 17), which ultimately disengages the hook assemblies 20 and the striker assemblies 22, which will be more fully described below. In another embodiment, the button 18 and cam member 26 are oriented to push the cable 16.

In a preferred embodiment, the cables 16 include the capability of being adjusted. This can be useful as the cables may stretch or lengthen over time. In a preferred embodiment, as shown in FIGS. 4-5B, the paddle button assembly 12 includes an adjustment lock 39 and adjustment nuts 40. The adjustment nuts 40 are similar to those used on bicycle brakes and or shifters. The adjustment lock 39 prevents the adjustment nuts 40 from turning when in the locked position and allows turning of the nuts (and, therefore, adjustment) when unlocked.

Figure 6:
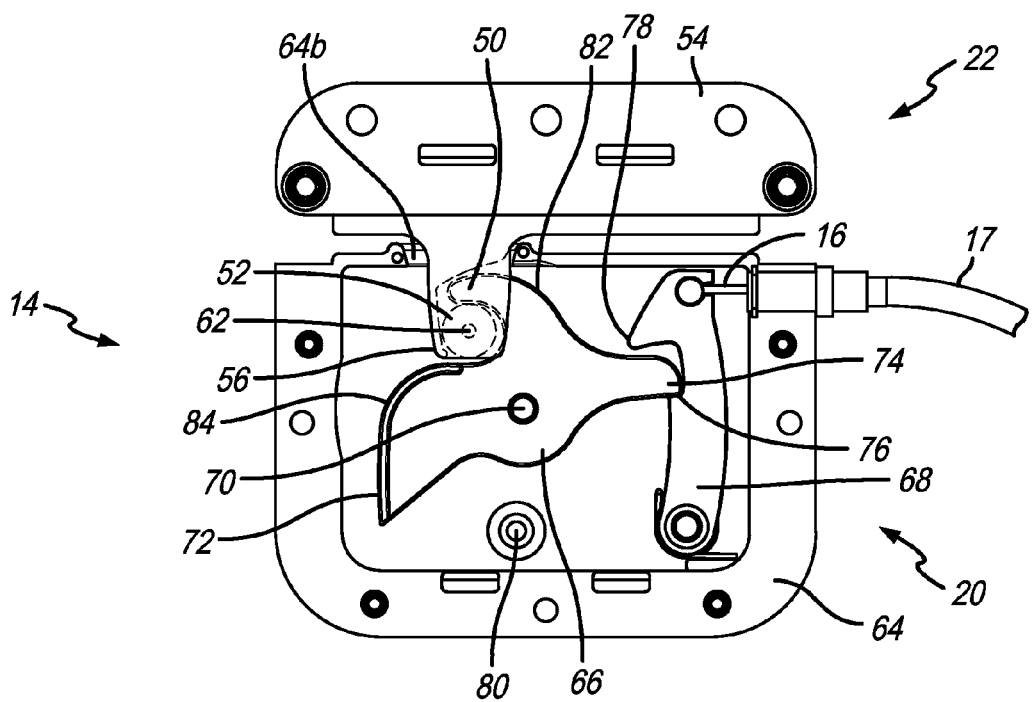
FIG. 6 is an elevational view of the latch assembly of the latch system of FIG. 1 with a portion of the housing removed and with the hook assembly and the striker assembly engaged with one another.
Figure 7:
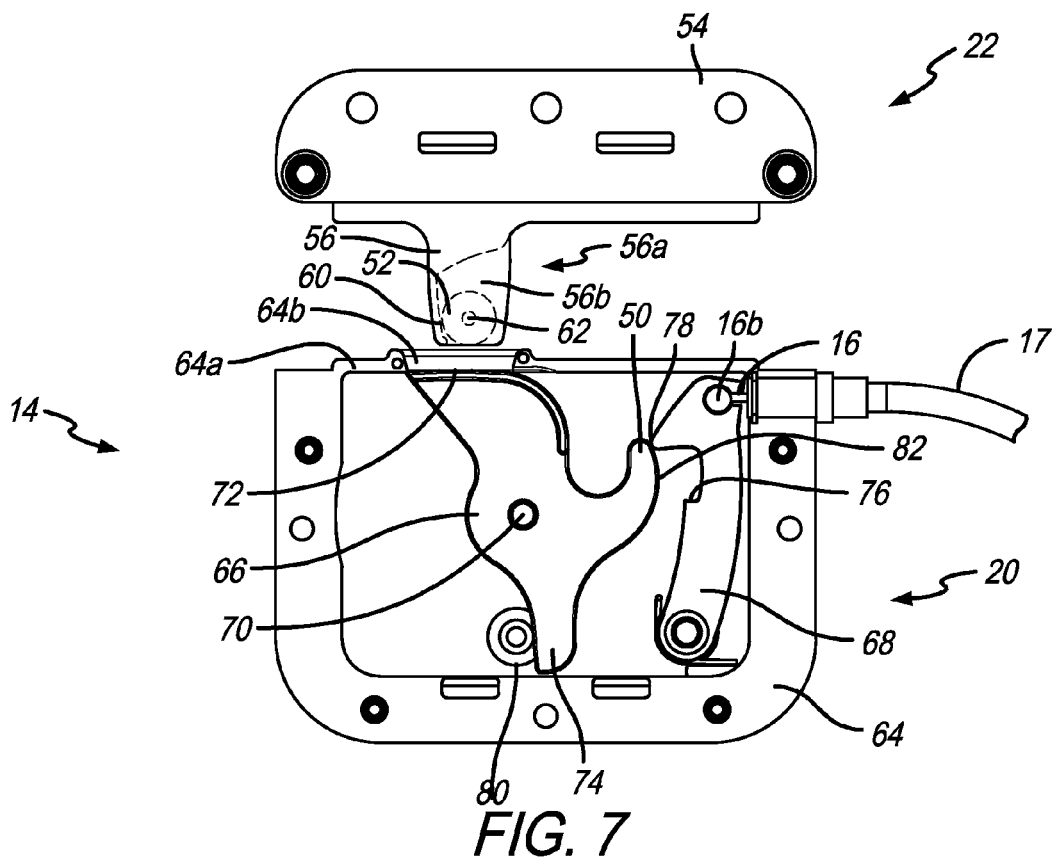
FIG. 7 is an elevational view of the latch assembly of the latch system of FIG. 1 with a portion of the housing removed and with the hook assembly and the striker assembly disengaged from one another.

The latch assemblies 14, one of which is shown in FIGS. 6 and 7, will now be described. Generally, the hook assembly 20 includes a hook 50 that engages a striker 52 on the striker assembly 22. When the hook 50 and striker 52 are engaged, the bucket is in the closed position. When the hook 50 and striker 52 are disengaged (by actuation of the button 18), the bucket moves to the open position.

As shown in FIGS. 6 and 7, in a preferred embodiment, the striker assembly 22 includes a casing 54 that is secured to the upper housing 104 and includes a striker housing 56 extending downwardly therefrom. The striker housing 56 defines a housing interior 58. The striker 52 comprises a bushing 60 that is rotatably received on a pin 62 that spans the housing interior. In a preferred embodiment, the striker housing 56 includes three sides, thereby defining a fourth side opening 56a that, together with the striker 52 defines a hook opening 56b into which the hook 50 is received.

In a preferred embodiment, the hook assembly 20 includes a housing 64 that defines a housing interior that houses the other components. In a preferred embodiment, the housing 64 is received in an opening in the side wall 110 of the bucket 102. The housing 64 includes a top wall 64a that has a striker opening 64b defined therein. Inside the housing 64, the hook assembly 20 includes a rotary member 66 and a pivotal trigger arm 68. The rotary member 66 is rotatably mounted on a pivot axle 70 and includes the hook 50 a closeout member 72 and a catch member 74. The rotary member 66 is rotatable between a first position (see FIG. 6) and a second position (see FIG. 7) and is biased toward the second position (preferably by a torsion spring that is concentric with the pivot pin). The trigger arm 68 is pivotally mounted to a pivot axle 70 and includes a ledge 76 and a ramp portion 78. The trigger arm is pivotal between an engaged position and a disengaged position and is biased toward the engaged position (preferably by a torsion spring that is concentric with the pivot pin).

As shown in FIG. 6, when the rotary member 66 is in the first position, the hook 50 is engaged with the striker 52 and the catch member 74 is engaged with the ledge 76 on the trigger arm 68. In this position, the hook 50 and striker 52 are engaged and the bucket is held in the closed position. When the cable 16 is pulled, as described above, the cable 16 pivots the trigger arm 68 to the disengaged position. In this position, the catch member 74 disengages from the ledge 76, and the rotary member 66 rotates to the second position (due to the bias). In a preferred embodiment, the catch member 74 engages a stop member 80, thereby preventing further rotation of the rotary member 66. As is shown in FIG. 7, when the rotary member 66 is in the second position, the closeout member 72 is aligned with the striker opening 64b in the top wall 64a of the housing 64. It will be understood that this serves two purposes. First, it prevents objects from entering the striker opening 64b. Second, it is part of the process for rotating the rotary member 66 back to the first position when the bucket is closed. In use, when the bucket is pivoted upwardly, the striker 52 enters the striker opening 64b and engages or contacts the closeout member 72. Because the closeout member 72 is offset from the pivot point of the rotary member 66, the engagement of the striker with the closeout member 72 causes the rotary member 66 to start to rotate toward the first position. The closeout member 72 includes a curved surface 84 that the striker 52 continues to push in to finish the rotation to the first position, thereby engaging the hook 50 with the striker 52.

As shown in FIGS. 5A-5B and FIGS. 8-9B, in a preferred embodiment, the paddle button assembly 12 includes an indicator 28 that is pivotally connected to the frame 24 (by a pivot pin) 29 and housed in an opening therein. The indicator 28 generally has a wedge shaped cross-section and is pivotal between a first position (see FIGS. 5A and 9A) where an outer surface 28a is flush with the outside surface of the flange 32 and a second position, where the side surfaces 28b are exposed. The indicator 28 is preferably biased toward the first position. The indicator 28 indicates when one or both of the hooks 50 are not engaged with the strikers 52.

Figure 8:
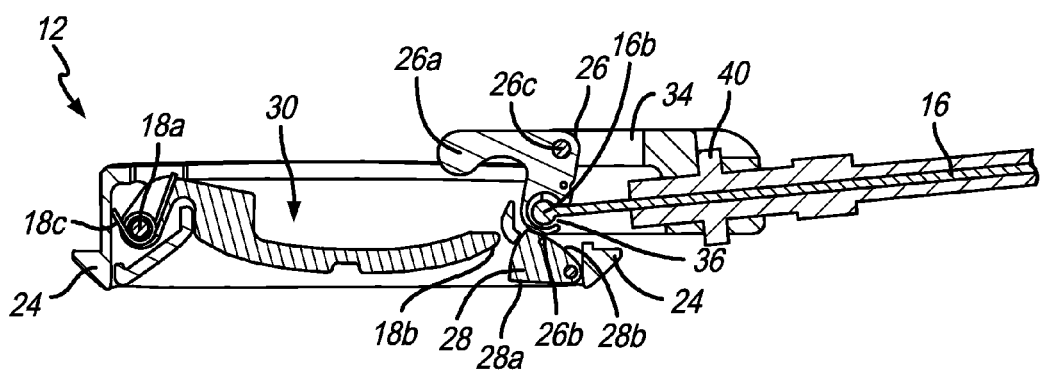
FIG. 8 is a cross-sectional view of the paddle button assembly with the indicator in the second position and the button in the home position.
Figure 9A:
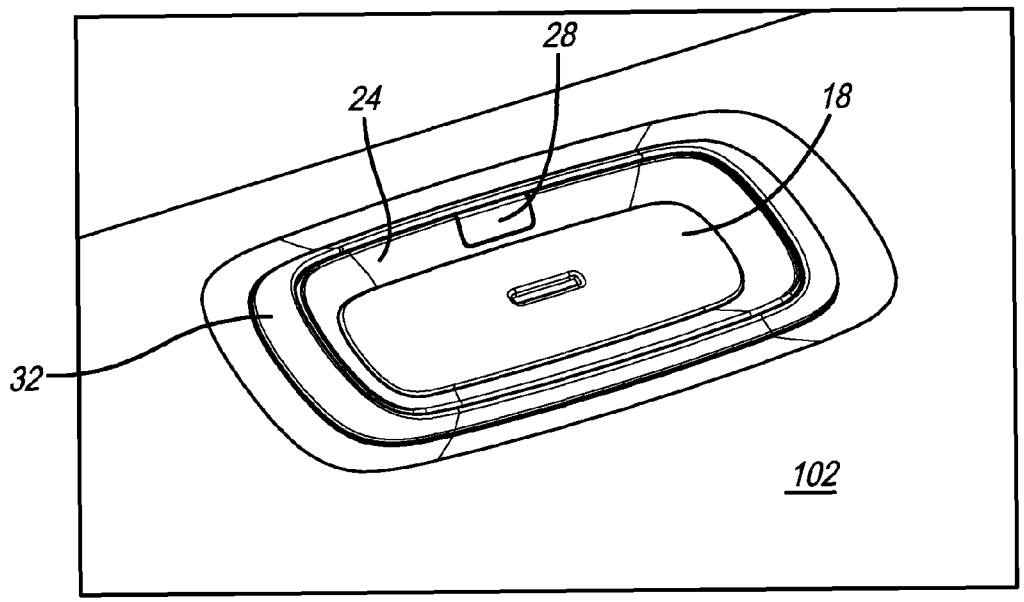
FIG. 9A is a perspective view of the paddle button assembly on the bucket with the indicator in the first position.
Figure 9B:
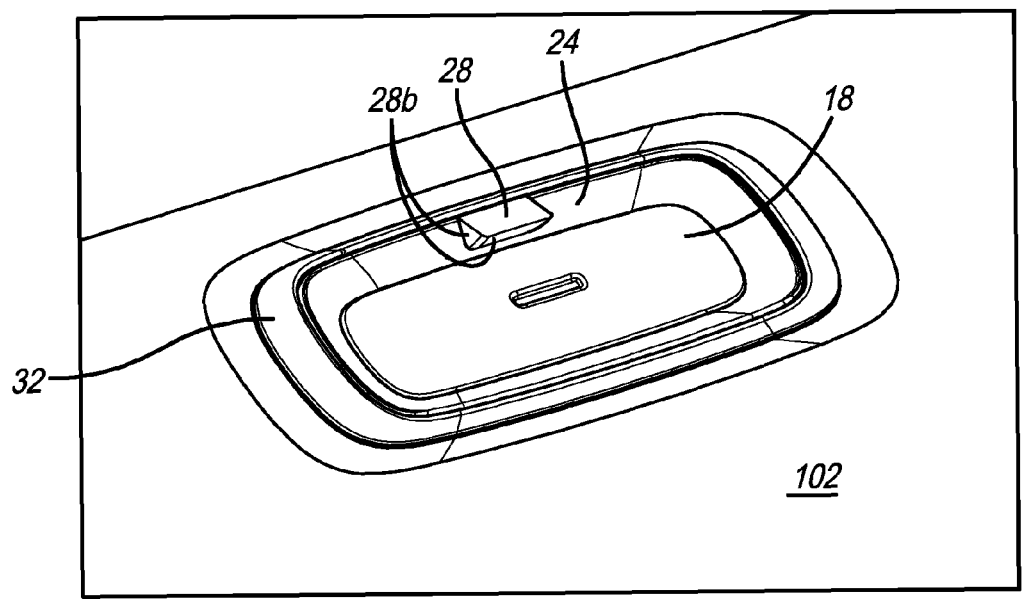
FIG. 9B is a perspective view of the paddle button assembly on the bucket with the indicator in the second (indication) position.

As shown in FIG. 5A, in the first position, the inner surface 28c of the indicator 28 is biased against both cable engaging ends 26b of the cam members 26. In use, when the button 18 is pivoted from the home position to the actuation position (as shown in FIG. 5B), the cam members 26 pivot and the cam engaging end 26b pivots the indicator 28 to the second position, thereby indicating that the hook 50 is not engaged with the striker 52. As is described above, when the cables 16 are pulled, the trigger arms 68 are pivoted from the engaged to the disengaged position, which causes the rotary members 66 to rotate from the first to the second position. It will be appreciated that as the rotary members 66 rotate to the second position, inclined surfaces 82 on the hooks 50 engage the ramp portions 78 of the trigger arms 68, which pivot the trigger arms 78 to the disengaged position and holds them there even after the button 18 has pivoted back to the home position. This action pushes the cables 16, which, in turn holds the cam members 26 and the indicator 28 in their respective second positions, as is shown in FIGS. 8 and 9B. During latching of the hooks 50 and strikers 52, when the trigger arms 78 are both moved to the engaged position, the cables 16 are pulled, thereby pivoting the cam members 26 and the indicator 28 to their respective first positions, as is shown in FIGS. 5A and 9A. It will be understood that if the bucket is closed improperly and only one of the first and second latch assemblies is latched (i.e., one of the strikers is not engaged with its hook), the cam member 26 associated with the unlatched latch assembly will hold the indicator in the second position, thereby indicating that something is wrong. In a preferred embodiment the side surfaces 28b of the indicator are a bright color. Therefore, when the bucket is in the closed position, but one of the latches is not properly latched a user (e.g., a flight attendant) will see that the indicator is in the position shown in FIG. 9B and can address the situation.

It will be appreciate that modifications can be made to the present invention. For example, the cable can be operably engaged with the hook and configured to pivot or rotate the hook to move the hook from a first to a second position and out of engagement with the striker. In this embodiment, the hook is biased toward the first position. To reengage the hook and striker, the hook includes an inclined surface thereon that is engaged by the striker to push the hook to the second position. Then after the striker clears the inclined surface the hook is biased back to the first position and into engagement with the striker. In this embodiment, the hook would act similar to the trigger arm in the current drawings. In the claims this embodiment may be covered by referring to the hook as a trigger arm. In another embodiment, the cable can be configured to pull or push the striker out of engagement with the hook. In another embodiment, the configuration of the button can be reversed so that the button is pulled to pivot and operate the cam members. In another embodiment, the cable is directly connected to the button so that pivoting the button pulls or pushes the cable to operate the latch. In another embodiment, the button is pushed in a linear direction to push the cable to operate the latch.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft storage bin that comprises:
   an upper housing that includes first and second side panels,
   a bucket that cooperates with the upper housing to define a bin interior, wherein the bucket is movable with respect to the upper housing between an open position and a closed position, wherein the bucket includes a bottom and first and second side walls, and
   a latch system that includes a paddle button assembly having a button that is movable between a home position and an actuation position to disengage a latch assembly that includes a hook assembly and a striker assembly,
   wherein the paddle button assembly is associated with one of the bucket and the upper housing,
   wherein the hook assembly is associated with one of the bucket and the upper housing and the striker assembly is associated with the other of the bucket and the upper housing, and
   wherein movement of the button from the home position to the actuation position disengages the hook assembly and the striker assembly, whereby the bucket moves from the closed position to the open position
   wherein the striker assembly includes a striker, wherein the hook assembly includes a rotary member that includes a hook and a closeout member, wherein the rotary member is movable between a first position where the hook is engaged with the striker and a second position where the hook is not engaged with the striker,
   wherein the rotary member is enclosed in a housing, wherein the housing includes a striker opening, wherein the closeout member is positioned to close the striker opening when the rotary member is in the second position,
   wherein when the bucket is moved from the open the position to the closed position, the striker contacts the closeout member, thereby moving the rotary member from the second position to the first position, engaging the hook with the striker and rotating the closeout member to a position where it is not positioned in the striker opening.

2. The aircraft storage bin of claim 1 wherein the latch system includes a cable that extends between the paddle button assembly and the latch assembly, and wherein movement of the cable causes movement of one of the hook and the striker to disengage the hook assembly and the striker assembly.

3. The aircraft storage bin of claim 2 wherein the button is pivotal between the home position and the actuation position, wherein pivotal movement of the button pushes or pulls the cable, thereby pivoting a trigger arm from an engaged position to a disengaged position and disengaging the hook from the striker.

4. The aircraft storage bin of claim 3 wherein the paddle button assembly includes an indicator that is movable from a first position to a second position when the button is moved from the home position to the actuation position, and wherein the hook maintains the trigger arm in the disengaged position when the rotary member is in the second position, thereby maintaining the indicator in the second position.

5. The aircraft storage bin of claim 1 wherein the rotary member is biased toward the second position.

6. The aircraft storage bin of claim 5 wherein the rotary member includes a catch member that engages a ledge on the trigger arm in the first position and a stop member in the second position.

7. The aircraft storage bin of claim 1 wherein the paddle button assembly includes an indicator that is movable from a first position to a second position when the button is moved from the home position to the actuation position.

8. The aircraft storage bin of claim 1 wherein the rotary member is rotatable about a rotation axis, wherein when the rotatory member is in the second position at least a portion of the closeout member is positioned on one side of the rotation axis and at least a portion of the hook is positioned on the opposite side of the rotation axis.

9. The aircraft storage bin of claim 1 wherein the closeout member includes a curved surface leading into a mouth of the hook, and wherein when the rotatory member rotates from the second position to the first position the striker slides on the curved surface.

10. The aircraft storage bin of claim 9 wherein the curved surface is convex.

11. A latch system comprising:
   a paddle button assembly that includes a button that is movable between a home position and an actuation position,
   a latch assembly that includes a striker assembly and a hook assembly, wherein the hook assembly includes a hook and the striker assembly includes a striker, wherein the hook assembly includes a rotary member that includes the hook, wherein the rotary member is movable between a first position where the hook is engaged with the striker and a second position where the hook is not engaged with the striker, wherein the rotary member is enclosed in a housing and includes a closeout member, wherein the housing includes a striker opening defined in a top wall thereof, and wherein the closeout member is positioned to close the striker opening when the rotary member is in the second position, and a cable that extends between the paddle button assembly and the latch assembly, wherein movement of the button from the home position to the actuation position moves the cable, thereby disengaging the hook assembly and the striker assembly.

12. The latch system of claim 11 wherein movement of the button from the home position to the actuation position pivots a cam member that pushes or pulls the cable.

13. The latch system of claim 11 wherein the button is pivotal between the home position and the actuation position, and wherein the pivoting of the button pushes or pulls the cable.

14. The latch system of claim 13 wherein pivotal movement of the button pushes or pulls the cable, thereby pivoting a trigger arm from an engaged position to a disengaged position and disengaging the hook from the striker.

15. The latch system of claim 14 wherein the paddle button assembly includes an indicator that is movable from a first position to a second position when the button is moved from the home position to the actuation position, and wherein the hook maintains the trigger arm in the disengaged position when the rotary member is in the second position, thereby maintaining the indicator in the second position.

16. The latch system of claim 11 wherein the rotary member is biased toward the second position.

17. The latch system of claim 16 wherein the rotary member includes a catch member that engages a ledge on the trigger arm in the first position and a stop member in the second position.

18. The latch system of claim 11 wherein the paddle button assembly includes an indicator that is movable from a first position to a second position when the button is moved from the home position to the actuation position.

19. The latch system of claim 11 wherein the cam member includes a button engaging end and a cable engaging end, and wherein movement of the button from the home position to the actuation position pivots the cam member thereby pushing or pulling the cable.

20. A method of opening a storage bin, the method comprising the steps of:

moving a button from a home position to an actuation position, wherein movement of the button from the home position to the actuation position moves a cable, thereby disengaging a hook assembly and a striker assembly, wherein a bucket moves from a closed position to an open position, wherein the hook assembly includes a hook and the striker assembly includes a striker, wherein the hook assembly includes a rotary member that includes the hook, wherein the rotary member is movable between a first position where the hook is engaged with the striker and a second position where the hook is not engaged with the striker, wherein the rotary member is enclosed in a housing, wherein the housing includes a striker opening defined in a top wall thereof, and wherein the closeout member is positioned to close the striker opening when the rotary member is in the second position.

21. The method of claim 20 wherein the button is pivotal between the home position and the actuation position, and wherein the pivoting of the button pushes or pulls the cable, thereby disengaging the hook assembly and the striker assembly.

22. The method of claim 21 wherein the button is pivotal between the home position and the actuation position, wherein pivotal movement of the button pushes or pulls the cable, thereby pivoting a trigger arm from an engaged position to a disengaged position and disengaging the hook from the striker.

* * * * *